United States Patent [19]

Kovacs

[11] 4,365,414

[45] Dec. 28, 1982

[54] VEGETABLE SLICER

[76] Inventor: Joseph Kovacs, 1977 Jarry St., East, Montreal, Quebec, Canada, H2E 1B7

[21] Appl. No.: 235,155

[22] Filed: Feb. 17, 1981

[30] Foreign Application Priority Data

May 1, 1980 [CA] Canada ........................ 351087

[51] Int. Cl.³ ........................ A47J 17/02

[52] U.S. Cl. ........................ 30/310

[58] Field of Search ........................ 30/276, 280, 310, 347

[56] References Cited

FOREIGN PATENT DOCUMENTS

| | | | |
|---|---|---|---|
| 2605301 | 2/1976 | Fed. Rep. of Germany | 30/310 |
| 2393509 | 2/1979 | France | 30/310 |
| 615915 | 6/1978 | U.S.S.R. | 30/310 |

*Primary Examiner*—Jimmy C. Peters

*Attorney, Agent, or Firm*—Browdy and Neimark

[57] ABSTRACT

A device for cutting vegetables into interconnected slices of generally helical configuration. The device comprises a cutting device including feed screw and an elongate cutting edge extending outwardly from the feed screw in direction normal to the axis of the feed screw. The feed screw has an axial opening to receive a skewer upon which a vegetable to be cut is mounted. The cutting device is then mounted on the skewer and is rotated advancing the cutting device into the vegetable to move the slicing device along the skewer and moves the cutting edge through the vegetable in a helical cutting path.

3 Claims, 3 Drawing Figures

VEGETABLE SLICER

The present invention relates to a device for cutting and slicing vegetables. More particularly, the present invention relates to a device for the continuous cutting of a vegetable into slices of interconnected helical configuration.

The device of the invention may be used to slice a vegetable such as a carrot into pleasing, attractive form, to enable the carrot to be attractively placed on a salad plate or the like. The device imparts to the vegetable a generally helically extending cut, enabling the vegetable after cutting to be extended and curved and to be arranged into any number of attractive appearances.

The device of the invention may also usefully be used to shorten the cooking time of vegetables such as carrots, potatoes, turnips, and the like, but the device is not specifically restricted to use on these specifically named vegetables.

The cooking time required for potatoes or carrots is considerably shortened when the vegetable has first been cut, using the present invention. In addition to resulting in an energy saving, the time for preparation is substantially reduced and less nutrients are leached from the vegetables during cooking particularly when the cooking is done in boiling water. The cooking time for vegetables such as a potato is also considerably reduced when the vegetable is baked in a standard oven or heated or cooked in a microwave oven or during any other cooking procedure.

DISCUSSION OF PRIOR ART

A device of this general type is known. This known device consists simply of an elongate blade having mounted at one end a solid feed screw and at the other end an opening to receive a finger to enable rotation of the knife blade around a vegetable being sliced. To present an attractive appearance after cutting, it is necessary that the feed screw advance through the vegetable in a reasonably straight line, for example axially through an elongate vegetable such as a carrot, or diametrically through a more rounded vegetable, such as a potato, and such direction control is almost impossible to achieve with the known device as rotation of the handle moves the feed screw from a straight line of advancement resulting in a most unattractive sliced product.

DISCUSSION OF PRESENT INVENTION

The purpose of the present invention is to avoid the deficiencies of the prior art device and provides a vegetable cutting device having a feedscrew which automatically follows a straight feed path, whether the path be axially through a vegetable such as a carrot, or diametrically through a more rounded vegetable, such as a potato.

In general, the device of the invention comprises cutting means including a feed screw and a cutting edge which extends outwardly from the feed screw at right angles, and wherein the feed screw has an axial opening to receive a skewer upon which a vegetable to be cut is mounted. The skewer is easily passed axially through a carrot, or diametrically through a potato or the like, so that it protrudes from the vegetable. The cutting means is then positioned on the skewer so that a protruding end of the skewer is positioned in the axial opening of the feed screw and the cutting means then rotated around the skewer resulting in an advancing helical cut being imparted to the vegetable. The feed screw will at all times follow along the skewer so that in all cases a properly sliced vegetable having uniform slices and having an attractive appearance results.

More particularly, the present invention relates to a device for cutting vegetables into interconnected slices of generally helical configuration, comprising cutting means having an elongate cutting edge, a feed screw in securement with the cutting means adjacent one end thereof, the axis of the feed screw being oriented in direction normal with the elongate cutting edge, the feed screw having an axial opening to receive a skewer upon which a vegetable to be sliced is mounted, the feed screw, upon rotation of the slicing means around the skewer, advancing into the vegetable to move the cutting means axially along the skewer in a helical cutting path.

The present invention also specifically relates to a device for cutting vegetables into slices of connected helical configuration comprising cutting means including a feed screw and an elongate cutting edge extending outwardly from the feed screw in direction normal to the axis of the feed screw, the feed screw having an axial opening to receive a skewer upon which a vegetable to be cut is mounted, the feed screw upon rotation of the slicing means about the skewer carrying a vegetable, advancing into the vegetable to move the slicing means axially along the skewer and the cutting edge through the vegetable into a helical cutting path.

In one preferred construction, the cutting means comprises a bent wire frame having an inner end bent into a feed screw and an outer end bent into a looped handle, the cutting edge being provided on a blade carried by the frame between the inner and outer ends thereof.

BRIEF DESCRIPTION OF ACCOMPANYING DRAWINGS

The invention will now be more specifically defined with reference to the accompanying drawings wherein.

DETAILED DESCRIPTION OF ACCOMPANYING DRAWINGS

Figure 1:
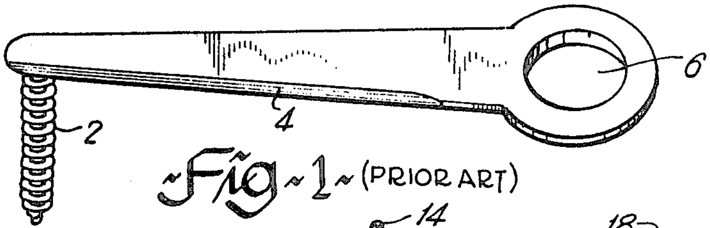
Fig-1 (PRIOR ART)
FIG. 1 is a perspective view of a prior art device.

FIG. 1 illustrates a known prior art device, and consists of a solid tapering screw 2, which is positioned at one end of a cutting blade 4, the axis of the screw being generally normal to the axis of the cutting blade. The other end of the cutting blade is provided with a finger opening 6 to facilitate rotation of the device with respect to a vegetable.

Figure 2:
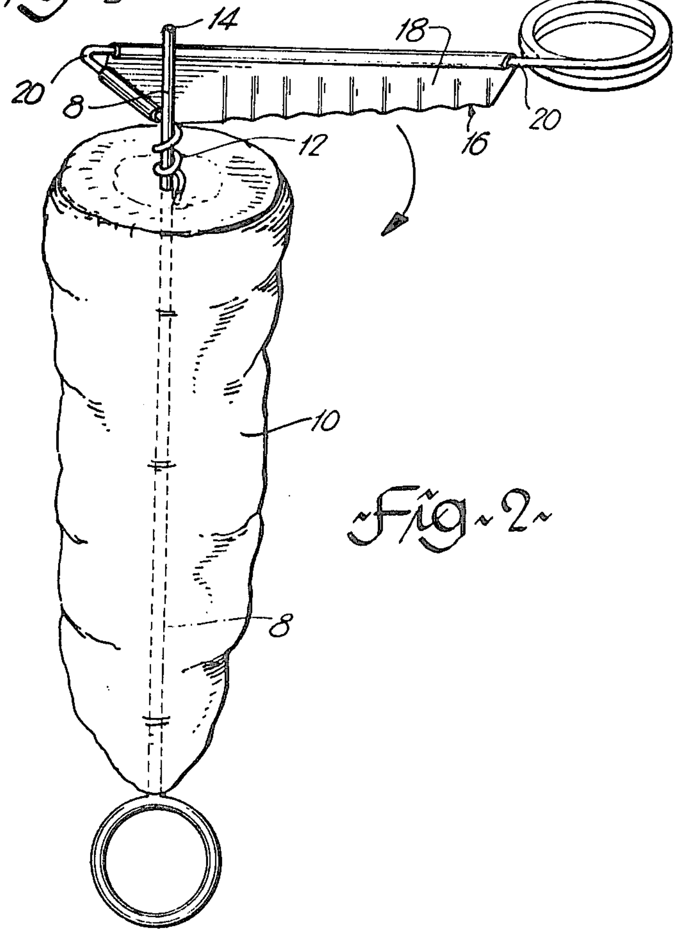
FIG. 2 is a perspective view of the device according to the present invention, showing the device mounted on an elongate skewer.

The device of the invention is shown in FIG. 2, and includes an elongate skewer 8 upon which a vegetable 10 is mounted. As discussed above, if the vegetable to be sliced is a carrot, the skewer will be passed axially through the carrot, or diametrically through other types of vegetables such as potatoes, so that the resulting cut product is as symmetrical as possible. It will be appreciated that the vegetables can be peeled or deskinned as required.

The inventive cutting device consists of a feed screw 12 having an axial opening (not specifically numbered) to receive the end 14 of the skewer 8. The skewer and vegetable carried thereby is held in one hand and the feed screw is advanced into the vegetable by rotating the cutting means around the skewer. A cutting edge 16 extends outwardly from the feed screw in direction normal to the axis of the feed screw. In the drawings the cutting edge 16 is provided on a cutting blade 18 carried by a suitable bent wire frame 20, the inner end of the wire frame being bent to form a helical, axially open feed screw 12, and the other end of the bent frame forming a loop handle 22 to facilitate use.

In FIG. 2, the cutting edge 16 is shown as being the edge of a knife blade 18 carried by the frame. It will be appreciated, however, that the cutting edge could be in the form of a cutting wire (not shown) carried by bent wire framing similar to that as shown in FIG. 2.

Figure 3:
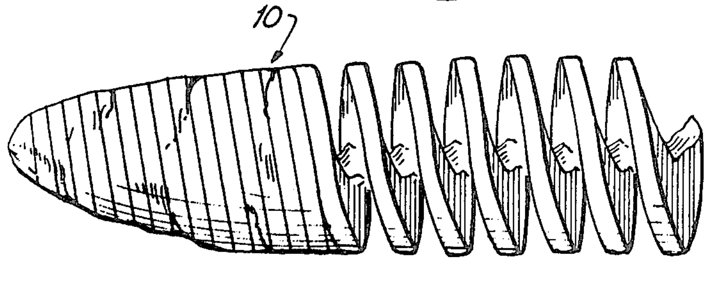
FIG. 3 illustrates a carrot cut into interconnected slices of helical configuration by the use of the device according to the present invention.

FIG. 3 illustrates a carrot 10 which has been cut using the device according to the present invention, and which has been partially axially lengthened to provide attractive appearance.

The vegetable after cutting and when it is still mounted on the skewer retains its original shape, but upon removal from the skewer may be axially lengthened helical fashion and curved into any desired shape to provide for pleasing appearance.

As shown in FIG. 3, the cutting edge on the cutting blade may have an undulating or stepped configuration, or could be serrated (not shown) as desired.

I claim:

1. A device for cutting vegetables into connected slices of helical configuration comprising cutting means comprising a bent wire frame with an inner end bent to form a feed screw and an outer end bent into a looped handle, and an elongate cutting blade having a cutting edge carried by the frame between the ends thereof with the blade extending outwardly from the feed screw in direction normal to the axis thereof, the feed screw having an axial opening to receive a skewer upon which a vegetable to be cut is mounted, the feed screw upon rotation of the cutting means about the skewer carrying a vegetable, advancing into the vegetable to move the slicing means along the skewer and the cutting edge through the vegetable in a helical cutting path.

2. A device according to claim 1, wherein the cutting blade has an undulating edge.

3. A device according to claim 1, wherein the feed screw has a helical configuration.

* * * * *